(12) United States Patent
Jolly

(10) Patent No.: US 11,290,589 B1
(45) Date of Patent: Mar. 29, 2022

(54) SYSTEMS AND METHODS FOR MULTIPLE RESOURCE SHARING AND SCHEDULING FOR GROUPS

(71) Applicant: Sunmeet Singh Jolly, San Jose, CA (US)

(72) Inventor: Sunmeet Singh Jolly, San Jose, CA (US)

(*) Notice: Subject to any disclaimer, the term of this patent is extended or adjusted under 35 U.S.C. 154(b) by 0 days.

(21) Appl. No.: 17/134,372

(22) Filed: Dec. 26, 2020

(51) Int. Cl.
*H04M 1/72448* (2021.01)
*H04W 4/08* (2009.01)
*H04M 1/72406* (2021.01)

(52) U.S. Cl.
CPC ... *H04M 1/72448* (2021.01); *H04M 1/72406* (2021.01); *H04W 4/08* (2013.01)

(58) Field of Classification Search
CPC ......... H04M 1/72445; H04M 1/72403; H04M 1/72469; H04M 1/72412; H04M 1/72415; H04M 1/72436; H04M 3/5183; H04M 1/72427; H04M 1/72457; H04M 2250/22; H04M 1/27475; H04M 1/7243; H04M 1/72466; H04M 2201/42; H04M 3/567; H04M 1/2746; H04M 1/724; H04M 2250/60; H04M 3/493; H04M 1/2748; H04M 1/72406; H04M 1/72442; H04M 1/72448; H04M 15/00; H04M 15/58; H04M 2201/40; H04M 2203/655; H04M 2250/10; H04M 3/5116; H04M 3/565; H04M 1/0237; H04M 1/27; H04M 1/2745; H04M 1/27453; H04M 1/2757; H04M 1/56; H04M 1/57; H04M 1/575; H04M 1/6091; H04M 1/642; H04M 1/663; H04M 1/72433; H04M 1/72439; H04M 1/72451; H04M 1/72454; H04M 1/72463; H04M 1/72484; H04M 11/00; H04M 11/10; H04M 15/43; H04M 15/44; H04M 15/46; H04M 15/55;
(Continued)

(56) References Cited

U.S. PATENT DOCUMENTS 7,535,367 B2 * 5/2009 Ratnakar ............. G06Q 10/025 705/5
7,548,866 B2 * 6/2009 Halavais ............... G06Q 10/02 705/5

(Continued)

*Primary Examiner* — Sheree N Brown (57) ABSTRACT

Systems and Methods for Group resource sharing and scheduling are disclosed. Group Resource Reservation application uses Computer networking, Internet cloud and Mobile smartphone's camera, computing power, storage, global positioning system, communication and graphical user interface abilities helping Group members in Sharing Resources like tennis courts, swimming pool, parking lots between authorized users; Assigning a Calendar to each Shared Resource accessible to all authorized users for booking time slots; Inviting one or more group members to access the shared resource, or join a group reservation; Sending notifications, Exchanging text messages, media files, having conversation with any group member, subset of whole group, or chat with entire group; Setting rules for each shared resource, which may include maximum time per booking, maximum group members per booking to limit crowding; Providing a Reward and Recognition mechanism to encourage sharing resources and following rules; Providing multiple levels of admin rights.

8 Claims, 12 Drawing Sheets

(58) Field of Classification Search
CPC ...... H04M 15/61; H04M 15/70; H04M 15/72; H04M 15/745; H04M 15/765; H04M 15/77; H04M 15/80; H04M 15/8066; H04M 17/00; H04M 2201/38; H04M 2201/39; H04M 2203/053; H04M 2203/1066; H04M 2203/2038; H04M 2203/2044; H04M 2203/251; H04M 2203/254; H04M 2203/355; H04M 2203/4509; H04M 2203/554; H04M 2207/18; H04M 2215/0188; H04M 2215/0192; H04M 2215/2013; H04M 2215/204; H04M 2215/2046; H04M 2250/02; H04M 2250/04; H04M 2250/06; H04M 2250/14; H04M 2250/56; H04M 2250/64; H04M 2250/66; H04M 3/00; H04M 3/42068; H04M 3/42204; H04M 3/4234; H04M 3/4931; H04M 3/5175; H04M 3/5307; H04M 3/533; H04M 3/53333; H04M 3/53366; H04M 3/562; H04M 7/0024; H04M 7/0027; H04M 7/0036; H04M 7/0078; H04M 7/0081; H04M 71/72448; H04W 4/08
USPC .......................................................... 715/738
See application file for complete search history.

(56) References Cited

U.S. PATENT DOCUMENTS

| | | | | |
|---|---|---|---|---|
| 7,693,732 B2* | 4/2010 | Cei | ..................... | G06Q 10/02 705/5 |
| 7,739,340 B2* | 6/2010 | Arenburg | ............ | G06Q 10/109 379/202.01 |
| 7,783,530 B2* | 8/2010 | Slemmer | ............ | G06Q 30/0633 705/28 |
| 8,103,729 B2* | 1/2012 | Tornabene | .......... | H04L 12/1818 709/206 |
| 8,285,570 B2* | 10/2012 | Meyer | ..................... | G06Q 50/14 705/5 |
| 8,416,064 B2* | 4/2013 | Leung | ..................... | H04W 4/14 705/28 |
| 8,655,701 B2* | 2/2014 | Groves | .............. | G06Q 10/1093 705/7.18 |
| 8,682,729 B2* | 3/2014 | Werbitt | ................... | G06Q 50/12 342/357.22 |
| 8,712,820 B2* | 4/2014 | Gingras | ............... | G06Q 10/109 705/7.18 |
| 8,799,037 B2* | 8/2014 | Stefik | ..................... | G08G 1/142 705/5 |
| 8,863,245 B1* | 10/2014 | Abhyanker | ............ | G06Q 10/10 726/4 |
| 8,932,091 B2* | 1/2015 | Nicholson | ................ | B63H 5/15 440/38 |
| 9,047,584 B2* | 6/2015 | Baldwin | ............... | G06Q 10/107 |
| 9,064,417 B2* | 6/2015 | Smullin | .............. | G01C 21/3685 |
| 9,092,109 B2* | 7/2015 | Carroll | ................... | H04L 51/046 |
| 9,501,213 B2* | 11/2016 | Costa | .................. | G06F 3/04845 |
| 9,667,769 B2* | 5/2017 | Clarke | ..................... | H04W 4/12 |
| 9,736,091 B2* | 8/2017 | Allen | ................. | G06Q 10/0637 |
| 9,978,043 B2* | 5/2018 | Jon | ........................ | G06F 3/0482 |
| 9,990,611 B2* | 6/2018 | Moore | .................. | G06Q 10/10 |
| 10,181,103 B2* | 1/2019 | Bramnick | .............. | G06Q 10/02 |
| 10,198,775 B2* | 2/2019 | Lobb | ...................... | G06Q 50/01 |
| 10,298,530 B2* | 5/2019 | Razavian | ............ | G06Q 10/1095 |
| 10,373,509 B2* | 8/2019 | Karpoff | .................. | G09B 5/125 |
| 10,375,004 B2* | 8/2019 | Gupta | ...................... | H04W 4/12 |
| 10,692,374 B2* | 6/2020 | Salvucci | .................. | G07F 17/24 |
| 2004/0215592 A1* | 10/2004 | Matsuura | ............. | G06Q 10/109 |
| 2006/0089845 A1* | 4/2006 | Marcell | ................. | G06Q 10/02 705/5 |
| 2007/0162315 A1* | 7/2007 | Hodges | .................. | G06Q 10/02 705/7.12 |
| 2009/0204600 A1* | 8/2009 | Kalik | ...................... | G01C 21/30 707/999.005 |
| 2012/0040751 A1* | 2/2012 | Peters | ..................... | G07F 17/32 463/29 |
| 2012/0179499 A1* | 7/2012 | Loeffen | ............. | G06Q 30/0601 705/5 |
| 2012/0203579 A1* | 8/2012 | Glasson | ................. | G06Q 10/02 705/5 |
| 2012/0232946 A1* | 9/2012 | Cocanougher | ....... | G06Q 10/109 705/7.19 |
| 2014/0379389 A1* | 12/2014 | Bornat | .................. | G06Q 10/02 705/5 |
| 2015/0039357 A1* | 2/2015 | Segal | ..................... | G06Q 10/10 705/5 |
| 2016/0110659 A1* | 4/2016 | Skeen | ................. | H04N 21/4825 705/5 |
| 2017/0178034 A1* | 6/2017 | Skeen | ................. | G06Q 10/02 |
| 2018/0374004 A1* | 12/2018 | Eone | .................. | G08G 1/149 |
| 2019/0012612 A1* | 1/2019 | Skeen | ................. | G06Q 30/0643 |
| 2019/0122448 A1* | 4/2019 | Volz | ................... | G06Q 30/0258 |

\* cited by examiner

SYSTEMS AND METHODS FOR MULTIPLE RESOURCE SHARING AND SCHEDULING FOR GROUPS

BACKGROUND—PRIOR ART

The following is a tabulation of some prior art that presently appears relevant:

U.S. Patents

| Patent No. | Issue Date | Patentee |
|---|---|---|
| U.S. Pat. No. 10,375,004 B2 | Aug. 6, 2019 | Gupta |
| U.S. Pat. No. 9,047,584 B2 | Jun. 2, 2015 | Baldwin et al. |
| U.S. Pat. No. 8,863,245 B1 | Oct. 14, 2014 | Abhyanker |
| U.S. Pat. No. 10,198,775 B2 | Feb. 5, 2019 | Lobb et al. |
| U.S. Pat. No. 8,103,729 B2 | Jan. 24, 2012 | Tornabene et al. |
| U.S. Pat. No. 7,739,340 B2 | Jun. 15, 2010 | Arenburg et al. |
| U.S. Pat. No. 9,667,769 B2 | May 30, 2017 | Clarke et al. |
| U.S. Pat. No. 8,655,701 B2 | Feb. 18, 2014 | Groves |
| U.S. Pat. No. 9,736,091 B2 | Aug. 15, 2017 | Allen et al. |
| U.S. Pat. No. 9,092,109 B2 | Jul. 28, 2015 | Carroll et al. |
| U.S. Pat. No. 10,373,509 B2 | Aug. 6, 2019 | Karpoff et al. |
| U.S. Pat. No. 9,990,611 B2 | Jun. 5, 2018 | Moore et al. |
| U.S. Pat. No. 9,026,590 B2 | May 5, 2015 | Michel et al. |
| U.S. Pat. No. 9,501,213 B2 | Nov. 22, 2016 | Costa et al. |
| U.S. Pat. No. 8,712,820 B2 | Apr. 29, 2014 | Gingras et al. |
| U.S. Pat. No. 8,732,091 B1 | May 20, 2014 | Abhyanker |
| U.S. Pat. No. 8,285,570 B2 | Oct. 9, 2012 | Meyer et al. |
| U.S. Pat. No. 7,783,530 B2 | Aug. 24, 2010 | Slemmer et al. |
| U.S. Pat. No. 7,693,732 B2 | Apr. 6, 2010 | Cei et al. |
| U.S. Pat. No. 10,181,103 B2 | Jan. 15, 2019 | Bramnick et al. |
| U.S. Pat. No. 7,535,367 B2 | May 19, 2009 | Ratnakar |
| U.S. Pat. No. 7,548,866 B2 | Jun. 16, 2009 | Halavais et al. |
| U.S. Pat. No. 10,692,374 B2 | Jun. 23, 2020 | Salvucci et al. |
| U.S. Pat. No. 9,064,417 B2 | Jun. 23, 2015 | Smullin et al. |
| U.S. Pat. No. 8,799,037 B2 | Aug. 5, 2014 | Stefik et al. |
| U.S. Pat. No. 8,416,064 B2 | Apr. 9, 2013 | Leung |
| U.S. Pat. No. 8,682,729 B2 | Mar. 25, 2014 | Werbitt |

U.S. Patent Application Publications

| Publication No. | Pub. Date | Applicant |
|---|---|---|
| U.S. 2012/0040751 A1 | Feb. 16, 2012 | Peters |
| U.S. 2018/0374004 A1 | Dec. 27, 2018 | Eone et al. |
| U.S. No. 2019/0122448 A1 | Apr. 25, 2019 | Volz |
| U.S. 2012/0203579 A1 | Aug. 9, 2012 | Glasson et al. |
| U.S. 2007/0162315 A1 | Jul. 12, 2007 | Hodges |
| U.S. 2006/0089845 A1 | Apr. 27, 2006 | Marcell et Al. |
| U.S. 2004/0215592 A1 | Oct. 28, 2004 | Matsuura et al. |
| U.S. 2012/0232946 A1 | Sep. 13, 2012 | Cocanougher et al. |
| U.S. 2009/0204600 A1 | Aug. 13, 2009 | Kalik et al. |
| U.S. 2012/0179499 A1 | Jul. 12, 2012 | Loeffen |

Advances in Smartphone technology, Internet, Cloud Computing, Social Networking and Group Chat have brought people closer. People now form large groups based on Interests and frequently communicate with each other, and mostly with whole Groups of people. They also plan many more group activities, events, trips, sports meetings etc. Technology has also enabled the Sharing Economy with people sharing homes, renting out rooms, couches, sharing cab rides, office space, carpooling, ordering food, groceries and medicines delivered by shared drivers etc. Most of the technology enabled platforms charge a transaction fee for platform use. They earn by keeping a portion of what consumers pay for renting the house, office, food delivery, grocery delivery, cab ride etc. But the sharing economy does not end there. What about sharing your unused Guest Parking lot with a neighbor who needs to have a big party at her home and needs ten parking spots for the evening? Sharing Tennis Courts? Swimming Pools? Basketball Courts? Ping Pong Tables? Club House? Parking Permits? Billiards Table? Conference Rooms? Projection Equipment?Volleyball Courts? Barbeque Grill? Party Furniture? DJ Equipment?Driveway? Backyard? Gym? The list goes on and on. We found no optimum technology platform that can help extend this shared economy to the next level.

While Group Chat apps and Social media platforms are supported by Advertising and come Free to their users, they are either optimized for faster, cheaper Communication among group members, or optimized for large scale media delivery and user engagement. They have not yet provided a collection of Group Productivity tools necessary for enabling this large scale sharing of resources. Most popular chat app used by two billion people worldwide is now allowing messages to disappear after seven days, making it even more difficult to use chat apps for group planning, organizing and scheduling purposes.

Existing systems and prior art related to Parking management present solutions for large commercial parking lot management, where a system needs to find how many parking spots are empty so cars can be routed efficiently. Many require hardware sensors and are Integrated with billing management and payment systems that charge a parking fee. These do not solve our problem of residential guest parking sharing, where neighbors voluntarily put their parking lot, parking permits or driveways up for sharing with other group members.

Similarly, most tennis court or basketball court reservations or conference room reservations are managed by administrative personnel for adding on to a calendar or spreadsheet. Many Homeowner associations and Apartment associations do not have adequate resources to manage shared resources. A good example is my own HOA in San Jose, Calif., who kept the Swimming Pool shut down for entire summer due to COVID because they didn't have enough staff to manage capacity restricted reservations for 100+ homes in our neighborhood who share the swimming pool and clubhouse. So, we were devoid of facilities while paying full HOA dues for 2020. Many other neighborhood Swimming pools were open, because they could afford administrative personnel who scheduled guest usage with capacity restrictions.

What we need is a self-service system with programmable rules, allowing any group member to book the shared resource (swimming pool, tennis court, club house etc.), and all group members with authorized access have a visibility into a shared resource's calendar, without need of administrative assistants or Homeowner's association personnel. During and well after COVID, such a system will be useful in helping maintain capacity restrictions in places that can otherwise get crowded. Also, nobody likes to wait for other team's tennis game to finish before they can start playing? What if we could schedule a time slot for tennis court in advance and arrive at the right time when its reserved for us? All without help of administrative people, using convenience of smartphones, and especially useful where payment is not needed for such access.

Additionally, existing Calendaring applications and prior art are focused on an Individual's calendar where a person decides to add appointments and schedules for himself, with an option to receive calendar invites from others, and decides on accepting or rejecting the appointment. Our need, however, is for a calendar system for a resource (like swimming pool or conference room), which needs to be booked by a group of authorized users having visibility and access to the shared resource's calendar, without need of administrative personnel. Also, a system where the booking rules are programmable and group members can communicate freely with individual members and group as a whole.

Our ideal application needs to allow all or a subset of authorized group members to add and set rules for booking resources they are putting up for sharing with others. Also, an ability to invite other users, communicate with them, and with the whole group simultaneously. For Instance, you may need three extra players for a basketball game and have already reserved the court, then you can make a group announcement or send personal messages to Individual group members, inviting them to join you.

Other than use of administrative staff, technology savvy people have used a mix of what's available in consumer technology to solve some of these problems. We discussed chat apps already. Some people use Online spreadsheets to maintain a resource booking schedule and link it to chat. Depending on chat volume, that link can get lost and not many people pay attention to everything that gets shared on chat windows. Another problem with linking online spreadsheets in mobile chat windows is that they open in mobile's web browser or another spreadsheet application. The user experience (UX) is horrible as these spreadsheets are not optimized to be viewed in mobile web browsers, or smaller screens. They are awfully slow to load and page formatting does not fit small mobile phone screens. The buttons, links and text entry are a nightmare in websites that open in mobile web browsers.

A lot of these consumer facing technologies were first built to be accessed on Internet browsers on laptops and desktops, and are now being customized for mobile phones in last few years. But they are far from achieving performance and user experience levels that are achieved by Mobile apps that are custom built, optimized and tested for their respective mobile hardware platforms.

Trusted research has shown that a vast majority of social Interactions happen on Mobile phones, and people are using smartphones for an average five to ten hours every day. Also, there is technology fatigue among consumers when it comes to linking too many technologies together or using too many different apps and websites. That convinced us to design the current invention that will solve Group resource sharing and resource scheduling problems, enhancing Group productivity, keeping people safe during pandemics like COVID, and saving money for users worldwide.

SUMMARY OF THE INVENTION

In the first embodiment of invention, the Group Resource Reservation application solves each of these problems by using Computer networking, Internet cloud and Mobile smartphone's camera, computing power, storage, global positioning system, communication and graphical user interface abilities helping the users in 1) Adding shared resources (examples—swimming pool, tennis court, parking lot, driveway) to share with a group of authorized users 2) Reserving a time slot on shared resource's calendar accessible to authorized users 3) Inviting one or more group members to access the shared resource or add themselves to a group reservation by sending them notifications from the application 4) Having direct conversation with any group member, a subset of whole group, or chat with entire group 5) Exchanging text messages, media files and communicating with all or subset of a group of users 6) Setting rules for each shared resource, which may include maximum time per booking, maximum group members per booking 7) Providing a Reward and Recognition mechanism to encourage sharing resources, and for obeying rules, for example— during COVID, not more then 10 members can reserve swimming pool for each booking 8) Providing multiple levels of admin access with different programing rights for each level.

The Group Resource Reservation Application will save users significant time and effort in scheduling group activities that require shared resources. It will make life safer during and after pandemics like COVID by restricting participation in a shared activity or common area. It will also promote better utilization of resources like limited guest parking lots or limited guest parking permits. With its reward and recognition system, the invention encourages users to share more resources, schedule group activities, find partners to play with, make more friends and leads to better relationships between group members.

The Group Resource Reservation Application will be made available worldwide, to be downloaded from leading app stores, for use on smartphones and tablets running on leading mobile operating systems. It will work efficiently between these devices, syncing data and images back and forth with Internet cloud servers using leading cloud computing and storage backend.

DETAILED DESCRIPTION OF THE EMBODIMENTS

The following description is intended to convey a thorough understanding of the invention by providing a number of specific embodiments and details Involving a system and method for providing Booking tools to help group members share resources with each other besides communicating with other group members, using modern hardware, software and processes. It is understood, however that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
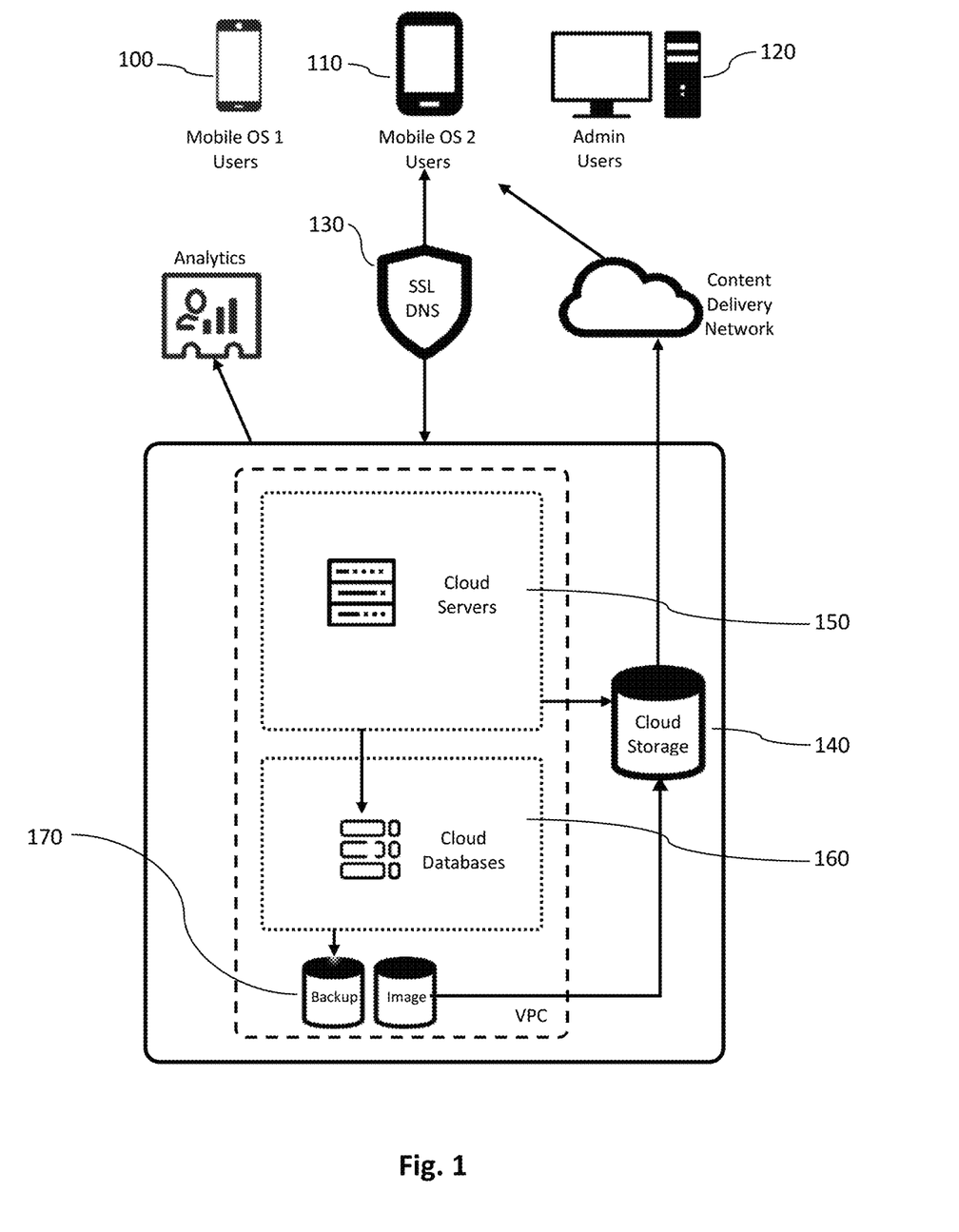
FIG. 1 is a block diagram depicting data synchronization between front end users using smartphones and tablet hardware devices running the Group Resource Reservation Mobile Application, Admin console users, and different components of backend Cloud infrastructure utilizing a leading cloud computing and cloud storage services provider

FIG. 1 is a block diagram depicting data synchronization between front end users using smartphones and tablet hardware devices running the Group Resource Reservation Mobile Application utilizing Mobile Operating System from a first leading provider 100 and a second leading Mobile Operating System provider 110, Admin console users 120, and different components of backend Cloud Infrastructure provisioned by a leading cloud computing and cloud storage services provider. Essential to functioning of current embodiment of this invention, downloadable as a mobile app, is extensive software development effort for these two distinct platforms. Mobile operating systems control different parts of smartphones and tablets including but not limited to Random Access Memory (RAM), Processor (CPU), display, touch screen, graphical user interface (GUI) elements, camera, file storage, phone contacts, messaging (SMS), email, maps (GPS), web browser, apps, photo storage, antenna, battery etc. Building the Group Resource Reservation Mobile App requires software development to build two different sets of binary files (also called application archive files or package files) for respective mobile operating systems and making them available separately on their respective app stores to be downloaded by users worldwide on smartphones and tablets. Both leading app stores test these application package files for each update before making them available to download worldwide. Once the mobile application files are downloaded by users on their respective mobile devices, they can sign up and start using the Group Resource Reservation Mobile Application with their friends, family, neighbors, sports groups, school groups, office groups, sharing resources and communicating seamlessly with group members.

First embodiment of the invention uses Internet cloud infrastructure provided by leading Web services provider, including Cloud storage 140 to store image files, Relational Database Service for operating scalable relational database servers 160 along with Backup databases 170 for frequent data backups, scalable computing power using Cloud Servers 150 and DNS services and SSL 130 certificate provisioning services. Admin console 120 that provides administrative access to user's data has a front end that can be accessed using internet browsers. Admin users 120 have the ability to view partial user records and selectively erase user data and delete or disable user accounts upon request. Content management frameworks can be used besides a variety of other technologies including HTML, JavaScript, CSS, React, PHP etc. to build web front end for admin console or provide web access to users.

Figure 2:
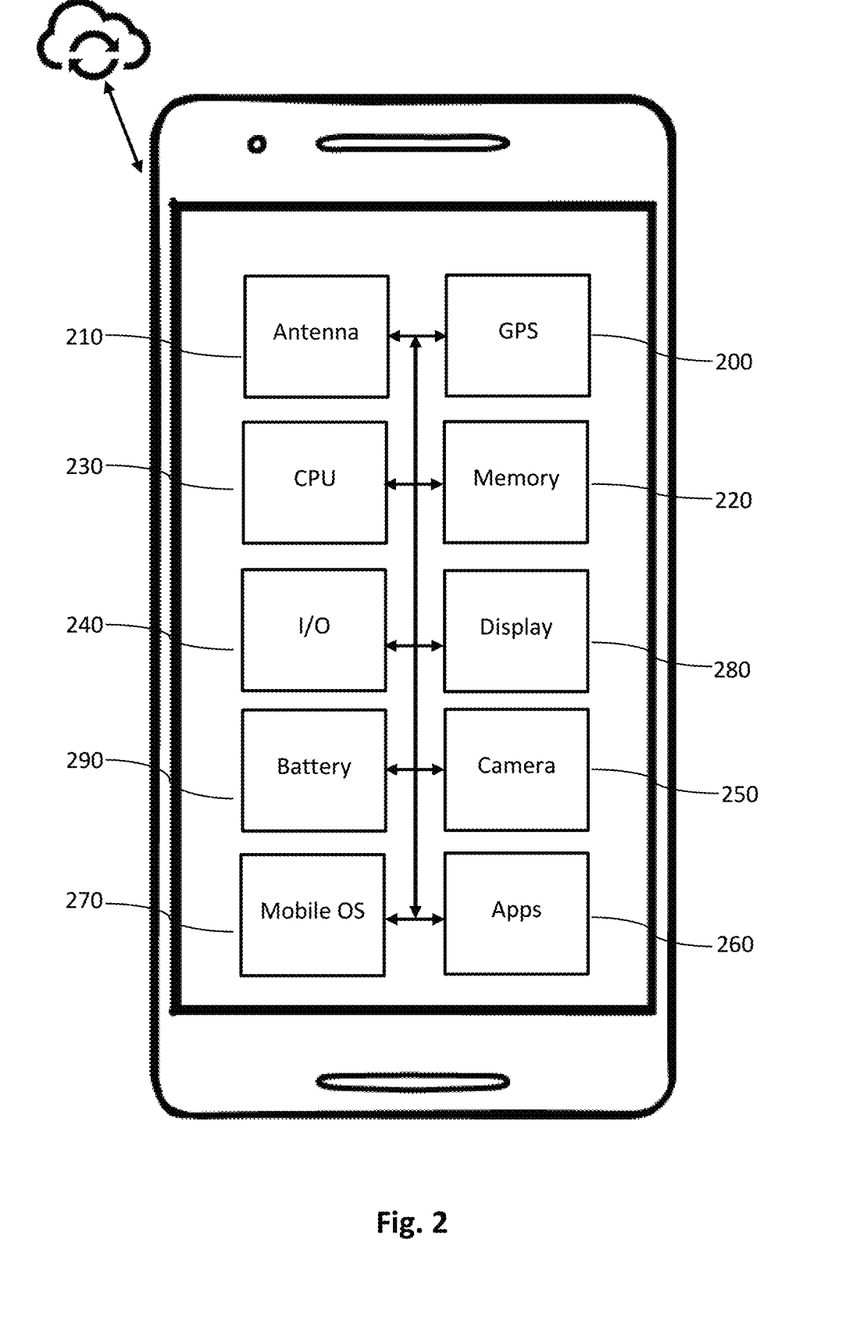
FIG. 2 depicts various hardware and software components of a mobile smartphone being utilized for operating the Group Resource Reservation Application

FIG. 2 depicts various hardware and software components of a mobile smartphone being utilized for operating the Group Resource Reservation Application. The Antenna 210 works with transmitter and receiver in transferring data between cloud backend and smartphone via Internet. Smartphone's Global Positioning System (GPS) 200 is used to locate the user on a map using satellite communication, which helps the mobile app Interact with Map apps 260 and Rideshare apps 260 on user's smartphone to help them get driving directions or book a ride to event location. The Group Resource Reservation Mobile application uses smartphone's CPU 230 for Computing power and Memory 220 for storing data and media files. Application also uses a number of Input and Output devices (I/O) 240 in smartphone including data and image display 280 with touchscreen input, ringer, notification sounds, speaker, keyboard, microphone etc. Most mobile phones are powered by rechargeable battery 290 and a Mobile Camera 250 is essential to capture photos and videos to be stored and shared via the Mobile application. At the heart of smartphone operation is a Mobile Operating System 270 that has necessary programming and Instruction set for operating all necessary Hardware and Applications 260 stored on the device.

Figure 3:
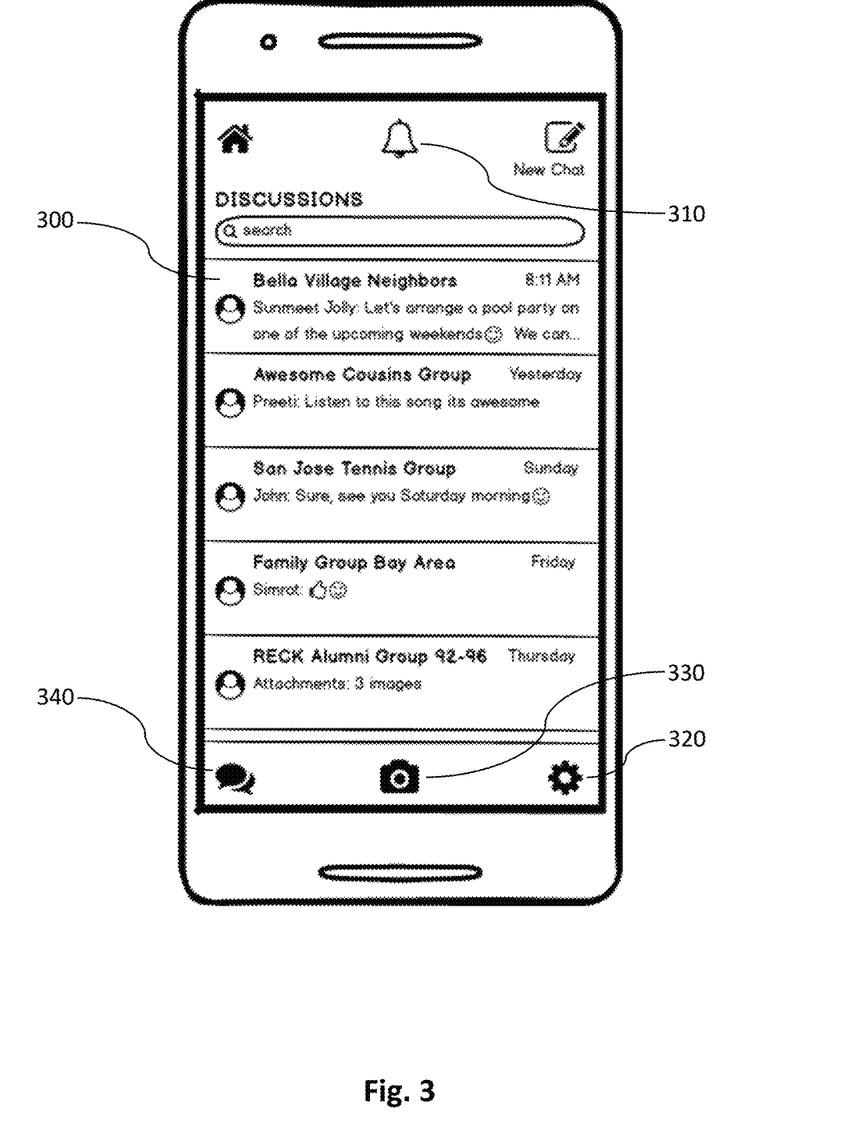
FIG. 3 depicts a scrollable screen of Group Resource Reservation Application providing list of all discussions that a user participates in, and user interface elements to navigate to other app features

FIG. 3 depicts a scrollable screen of Group Resource Reservation Application providing list of all discussions 300 that a user participates in, and user interface elements to navigate to other app features. These include Notifications 310 to alert the user of any group member communicating with them via direct message, or inviting them to participate in a group activity they have reserved, or other notifications pertaining to discussions and activities in user's chat groups. A Tab bar appears at the bottom of the app screen and provides the ability to quickly switch between different sections of the app Including Camera 330 to capture photos and videos or access media files stored on smartphone, Settings 320 to select user preferences or group preferences, and List of Discussions 340 as currently shown on screen.

Figure 4:
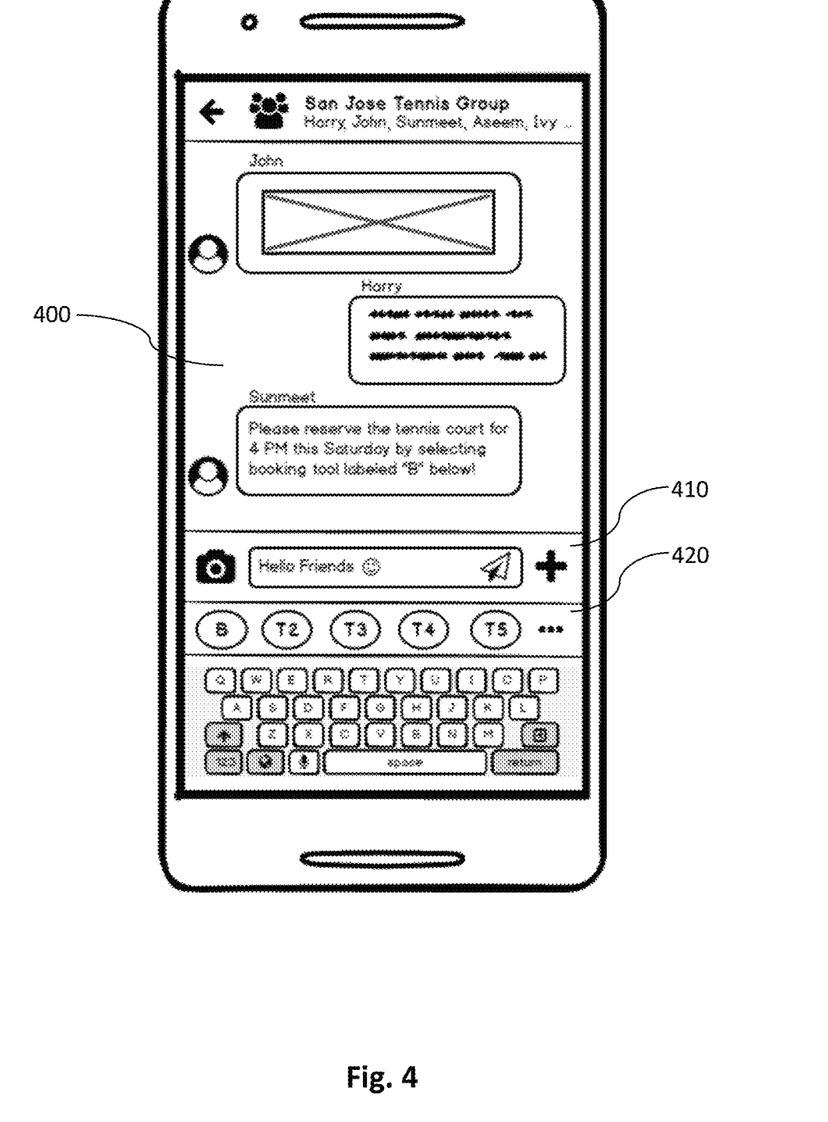
FIG. 4 depicts a group chat screen with user interface elements allowing a user to insert text, photos and pull up additional tools

FIG. 4 depicts a group chat screen 400 with user interface elements allowing a user to insert text, photos and pull up additional tools. User can enter chat text in text input box, insert photo or pull up camera for additional media insertion, or expand the menu 410 to select additional choices. The App drawer bar 420 above keyboard includes buttons to call external apps residing on smartphone and other tools built into the Group Resource Reservation Application along with the Booking tool (B).

Figure 5:
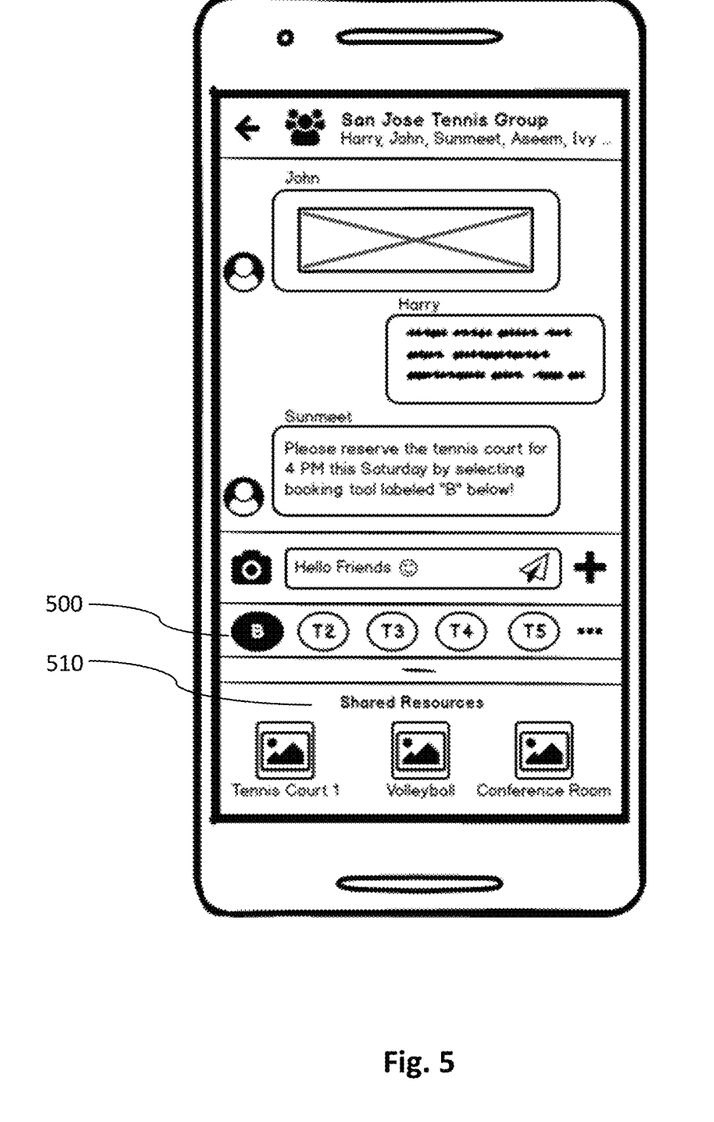
FIG. 5 depicts booking tool selected from the toolbar in group chat screen

FIG. 5 depicts Booking tool (B) 500 selected from the toolbar in group chat screen. When user presses the button and selects Booking tool (B), the keyboard is replaced by a partially opened Shared Resources 510 screen, which can be expanded by user dragging it up to reveal all shared resources.

Figure 6:
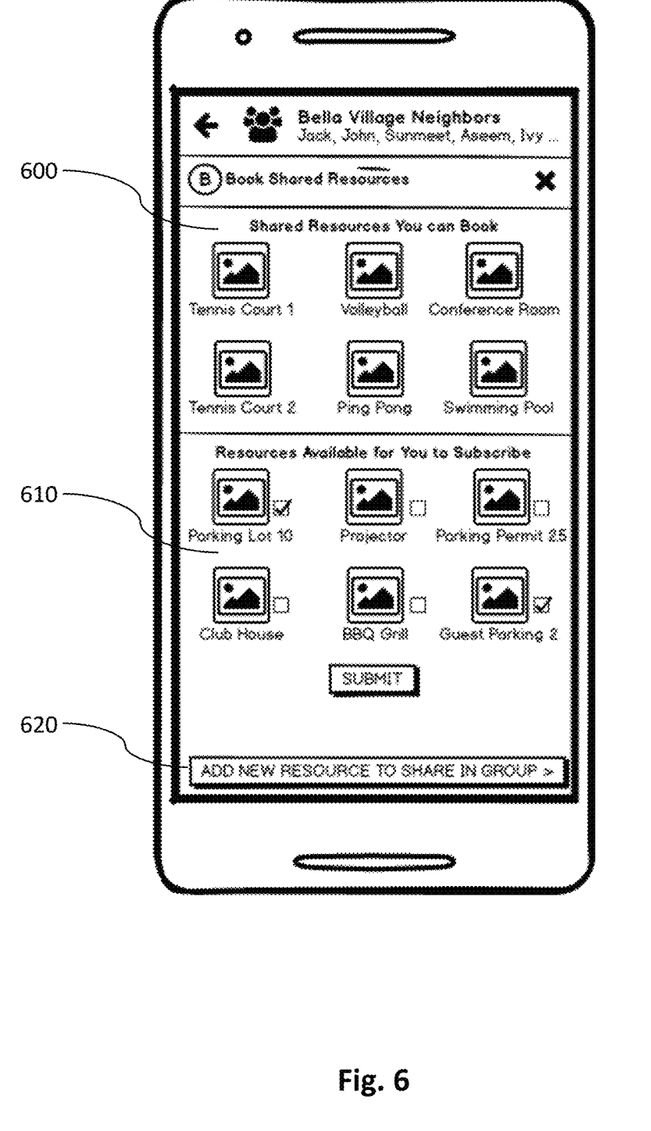
FIG. 6 depicts the fully expanded view of shared resource booking screen, showing all shared resources available to the user

FIG. 6 depicts the fully expanded view of shared resource booking screen, showing all shared resources available to the user. First section includes Shared Resources 600 that the user has already subscribed to, and Shared resources available to all group members. Second section includes Shared Resources 610 that user has been Invited to subscribe to but has not yet accepted subscription for those. User can choose which ones he wants to subscribe to. Additionally, the user can add a New Shared Resource 620 by clicking button at bottom of this screen.

Figure 7:
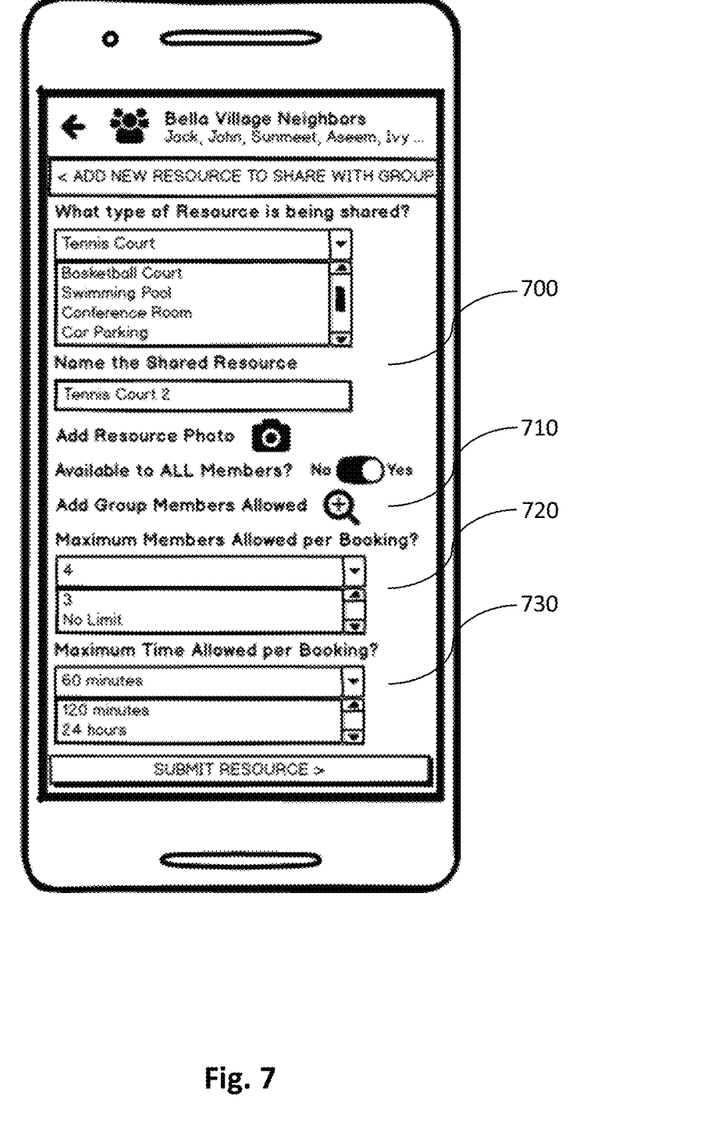
FIG. 7 depicts a screen with user interface elements helping user in entering details of a new resource to share with the group

FIG. 7 depicts a screen with user interface elements helping user in entering details of a new resource to share with the group. User can enter shared resource details 700 including resource type, name and add a photo. Next, the user choses to allow all group members to access this resource, or selects the members 710 he wants to invite. For example—user maybe living in an apartment community of 200 homes but choses to invite only 20 of his close neighbors to share his parking lot. Next, the resource sharer decides the maximum number of simultaneous users 720 per booking. For example—A home owner's association can decide to limit swimming pool use to maximum 10 people per booking slot due to COVID or another pandemic. Finally, the resource sharer decides the maximum time allowed 730 per booking. For example—Maximum 2 hours per reservation for Tennis courts.

Figure 8:
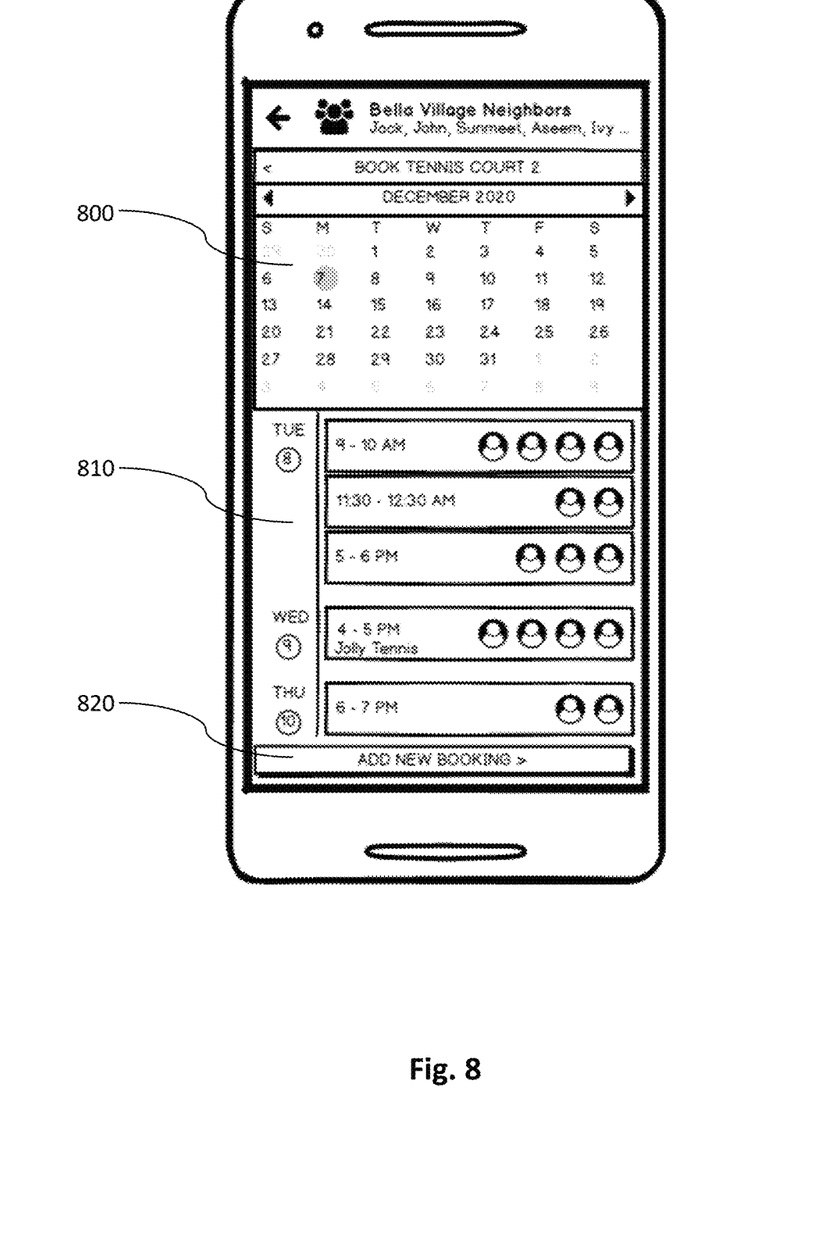
FIG. 8 shows the calendar selection and reservations list for a shared resource, tennis court 2

FIG. 8 shows the calendar selection and reservations list for a shared resource, tennis court 2. One of the unique and Important features of Group Resource Reservation System is that each resource has a calendar 800 associated with it, which is visible to all group members who are authorized to reserve that resource. A group member wishing to reserve a slot has visibility 810 into which time slots are taken, and by which group members. Based on availability and user preference, the member can join an existing booking or Add new booking 820 by clicking on button at bottom of screen.

Figure 9:
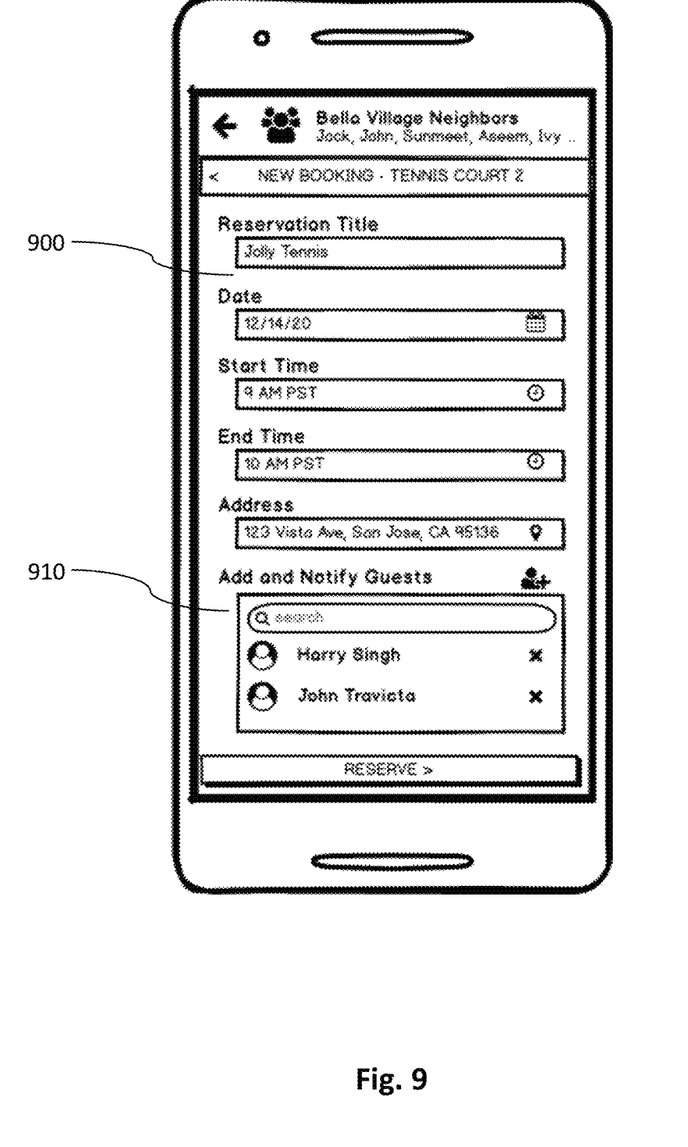
FIG. 9 shows a booking screen allowing the user to reserve a time slot for a shared resource, tennis court 2

FIG. 9 shows a booking screen allowing the user to reserve a time slot for a shared resource, tennis court 2. The user enters required details 900 including reservation title, date, start time, end time and address. He invites 910 other group members to join him for the tennis game. The system can be programmed to allow only registered group members to be Invited, or send out invitations using SMS and Emails for new users who may not be group members yet, or may not have the mobile app Installed.

Figure 10:
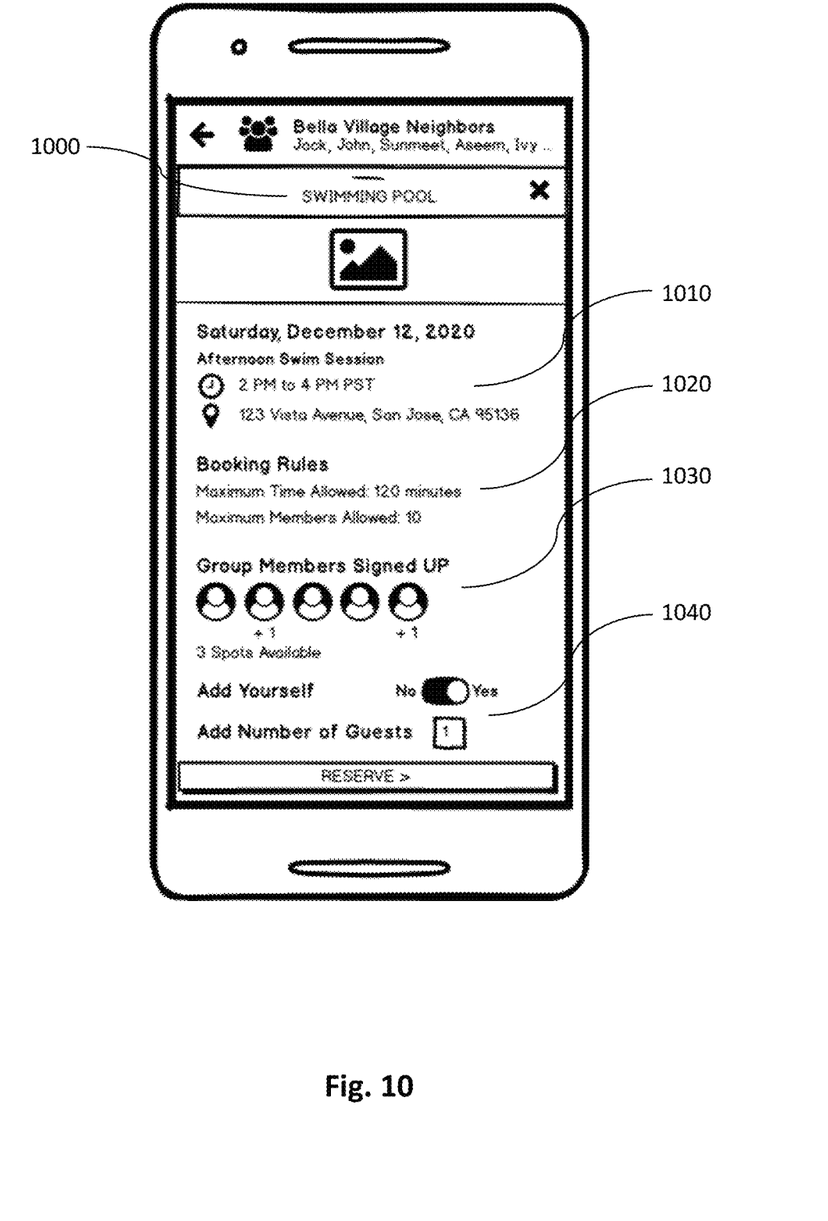
FIG. 10 depicts a screen providing existing booking details for a shared resource, swimming pool, allowing the user to add themselves and guests to that reserved time slot with limited occupancy

FIG. 10 depicts a screen providing existing booking details for a shared resource, swimming pool 1000, allowing the user to add themselves and guests 1040 to that reserved time slot with limited occupancy allowed. Reservation details include date and time slot 1010 which can be optionally programmed to be clickable so users can add it to their personal calendars as well. Similarly, event address can be programmed to link to maps apps and ride share apps on user's smartphone, using the GPS to help user in driving directions and or booking a ride. Booking rules 1020 are displayed for user's benefit. Finally, this screen shows a user which other members along with their guests have already booked this reservation 1030 and the number of spots still available.

Figure 11:
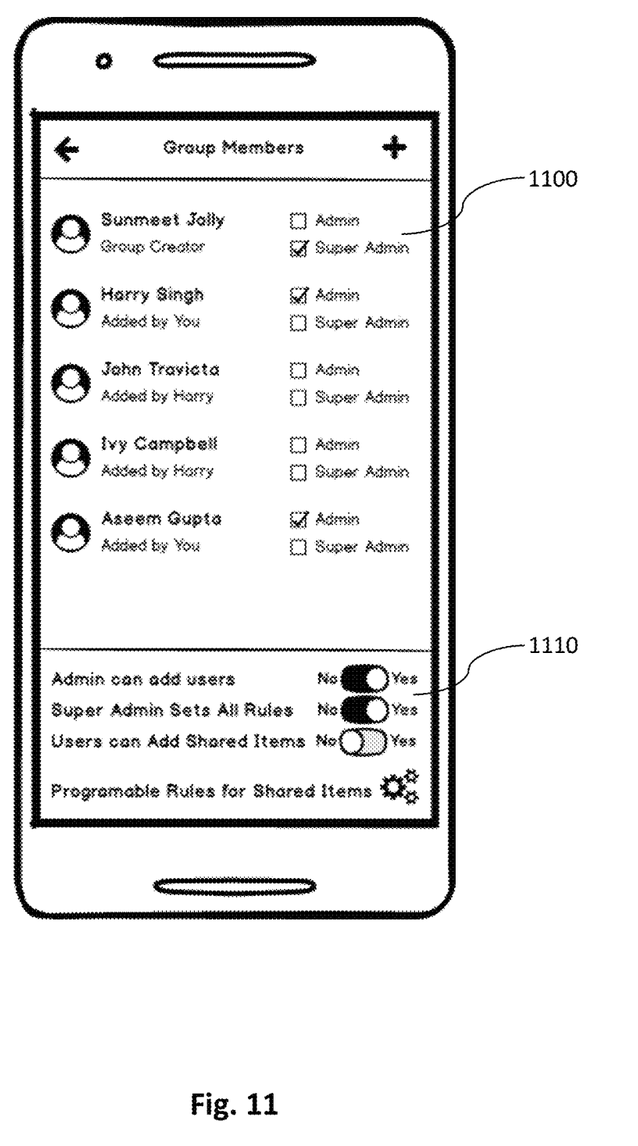
FIG. 11 shows a screen providing list of all users in a chat group, with an ability to designate their admin level for authorization, as well as programmable rules for the group

FIG. 11 shows a screen providing list of all users in a chat group, with an ability to designate their admin level for authorization, as well as programmable rules for the group. Another unique and Important feature of Group Resource Reservation Application is multiple levels of Admin control, where Admins and Super Admins 1100 have different levels of authorization. For Instance, a Home owner's association may keep the Super Admin authority with themselves, setting rules for Ordinary users and Admin users and designating what each level is authorized to do. Finally, System setting allows rules to be programmed 1110 for each Group.

Figure 12:
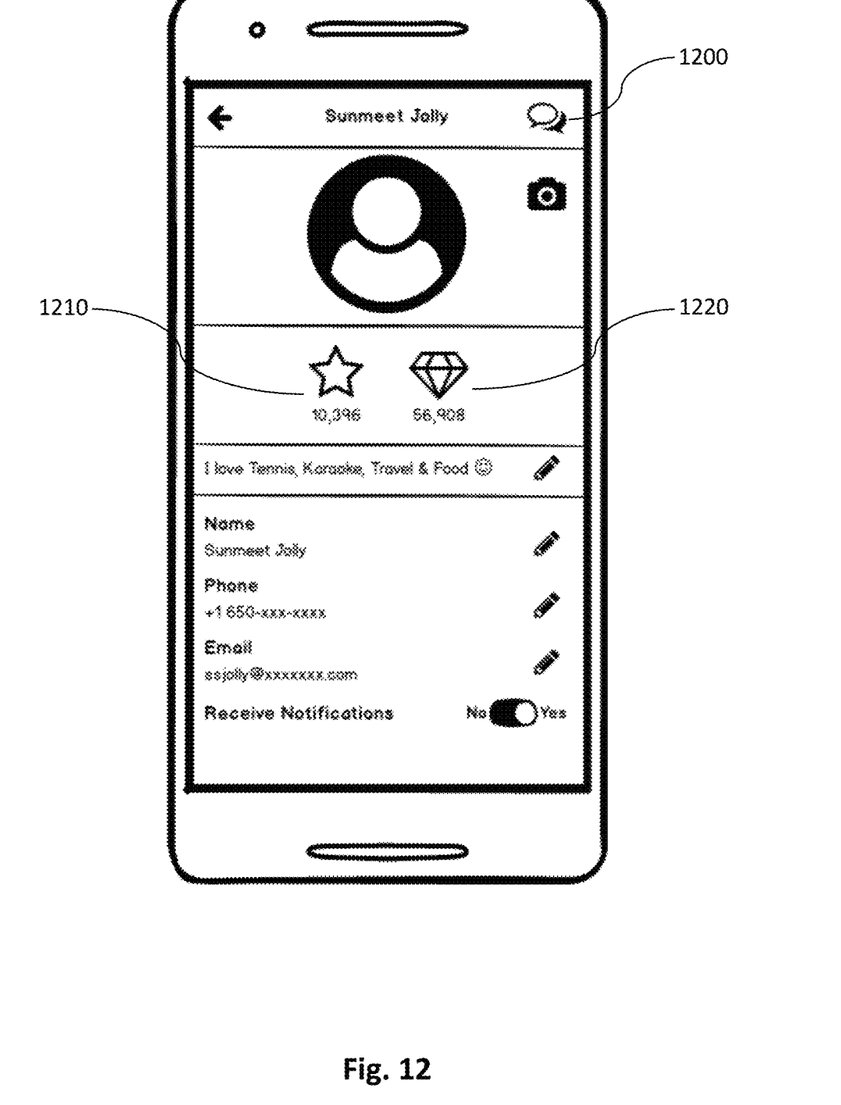
FIG. 12 shows user profile screen with their account details, user interface elements to edit details, and ability for other users in group to send direct messages to this user

FIG. 12 shows user profile screen with their account details, user interface elements to edit details, and ability for other users in group to send direct messages 1200 to this user. An important and unique feature of Group Resource Reservation application is to have a reward and recognition mechanism for adherence to rules and sharing more with group members. This is accomplished by a having a Star rating 1210 system, where other users can award star points to users who are sharing more resources, like parking lot, or helping the group in other ways. Similarly, we can have a rewards system where users gift each other diamonds 1220 for helping out with stuff. Finally, a payment mechanism can be built into the Application for actual purchase of goods and services, which is an optional feature not shown on the screen. How about doing yard sale using the application and getting paid for clearing old household stuff?

While the above description contains many specificities, these should not be construed as limitations on the scope of any embodiment, but as exemplifications of various embodiments thereof. Many other ramifications and variations are possible within the teachings of the various embodiments. For example, another embodiment can be a web browser application that can be accessed on popular web browsers like Chrome, Safari, Internet explorer, Firefox etc. on laptops, desktop and phones/tablets. It is also possible to add additional modules to Group Resource Reservation Application to add functionality that can help groups in communicating and planning more effectively. We can add additional features to chat including supporting variety of media files other than Images, allowing group voice calls, group video calls and processing payments through the app or Integrating APIs of payment gateways, banks etc. with the app.

Thus, the scope should be determined by the appended claims and their legal equivalents, and not by the examples given.

What is claimed is:

1. A method of sharing multiple resources between group members using mobile smartphones and computer applications comprising:
   downloading and installing a mobile application on smartphones running on a mobile operating system;
   creating user accounts with unique identification that may include mobile phone number and email address to sign up users from around the world;
   administering user accounts where admin account holders can analyze, disable or delete user accounts or user data;
   creating private invite only networks to facilitate data and image exchanges between users using the internet;
   creating and deleting virtual private networks based on user needs and functionality implemented in the mobile application;
   processing and storing user data and images using the mobile smart phone and using relational databases in cloud, cloud servers, cloud image storage, cloud analytics and cloud computing services;
   providing a first user interface where users can add multiple resources to share with some or all group members and inviting one or more group members to reserve the shared resource or join a group reservation;
   providing a second user interface allowing assignment of a calendar to each shared resource accessible to all authorized users for booking time slots;
   providing a third user interface allowing setting user defined rules for each shared resource, which may include maximum time per booking, maximum group members per booking;
   providing a fourth user interface allowing users to send notifications, exchange text messages, media files and have conversation with any group member, subset of whole group, or chat with entire group;
   providing a fifth user interface with a list of shared resources user can book and another list of shared resources that user has been invited to subscribe to;
   providing a sixth user interface for assigning three different levels of authority to group members designating them as general users, admins or super admins and a set of programmable rules for shared resources.

2. The method of claim 1, wherein multiple levels of administrative rights and programming roles are available to be assigned to general users, admins and super admins in a group.

3. The method of claim 1, wherein reward and recognition mechanism is provided to encourage sharing resources and following rules among group members.

4. The method of claim 1, wherein a resource sharing and scheduling tool is accessible from group conversation screen of mobile application.

5. The method of claim 1, wherein the mobile application can exchange data with personal calendar apps, map apps, photo apps, contact apps, rideshare apps installed on user smartphone.

6. The method of claim 1, wherein each booking on shared resource's calendar displays details of group members participating in that reservation.

7. A system comprising computer hardware, internet web services, mobile smartphones, mobile operating systems, mobile applications, web applications exchanging and processing data and images between users, providing group conversation and scheduling tools to help share multiple resources between group members wherein the mobile smartphones include user interfaces allowing users to:
- create private invite only networks to facilitate data and image exchanges between users using the internet;
- create and delete virtual private networks based on user needs and functionality implemented in the mobile application;
- process and store user data and images using the mobile smart phone and using relational databases in cloud, cloud servers, cloud image storage, cloud analytics and cloud computing services;
- view a list of shared resources user can book and another list of shared resources that user has been invited to subscribe to;
- add multiple resources to share with some or all group members and invite one or more group members to reserve the shared resource or join a group reservation;
- assign a calendar to each shared resource accessible to all authorized users for booking time slots;
- set user defined rules for each shared resource, which may include maximum time per booking, maximum group members per booking;
- send notifications, exchange text messages, media files and have conversation with any group member, subset of whole group, or chat with entire group;
- designate multiple levels of admin roles and programming rights to general users, admins and super admins in a group.

8. A system comprising computer hardware, Internet web services, mobile smartphones, mobile operating systems, mobile applications, web applications exchanging and processing data and images between users, providing group messaging tools to help group members have conversations along with multiple resource sharing and group event scheduling wherein the mobile smartphones include user interfaces allowing users to:
- create private Invite only networks to facilitate data and image exchanges between users using the Internet;
- create and delete virtual private networks based on user needs and functionality implemented in the mobile application;
- process and store user data and images using the mobile smart phone and using relational databases In cloud, cloud servers, cloud image storage, cloud analytics and cloud computing services;
- send notifications, exchange text messages, media files and have conversation with any group member, subset of whole group, or chat with entire group;
- view a list of shared resources user can book and another list of shared resources that user has been invited to subscribe to;
- add multiple resources to share with some or all group members and invite one or more group members to reserve the shared resource or join a group reservation;
- assign a calendar to each shared resource accessible to all authorized users for booking time slots;
- set user defined rules for each shared resource, which may include maximum time per booking, maximum group members per booking;
- exchange data and media files with other applications Installed on user smartphone;
- use reward and recognition mechanism to encourage sharing resources and following rules among group members;
- designate multiple levels of admin roles and programming rights to general users, admins and super admins in a group.

* * * * *